Patented May 29, 1923.

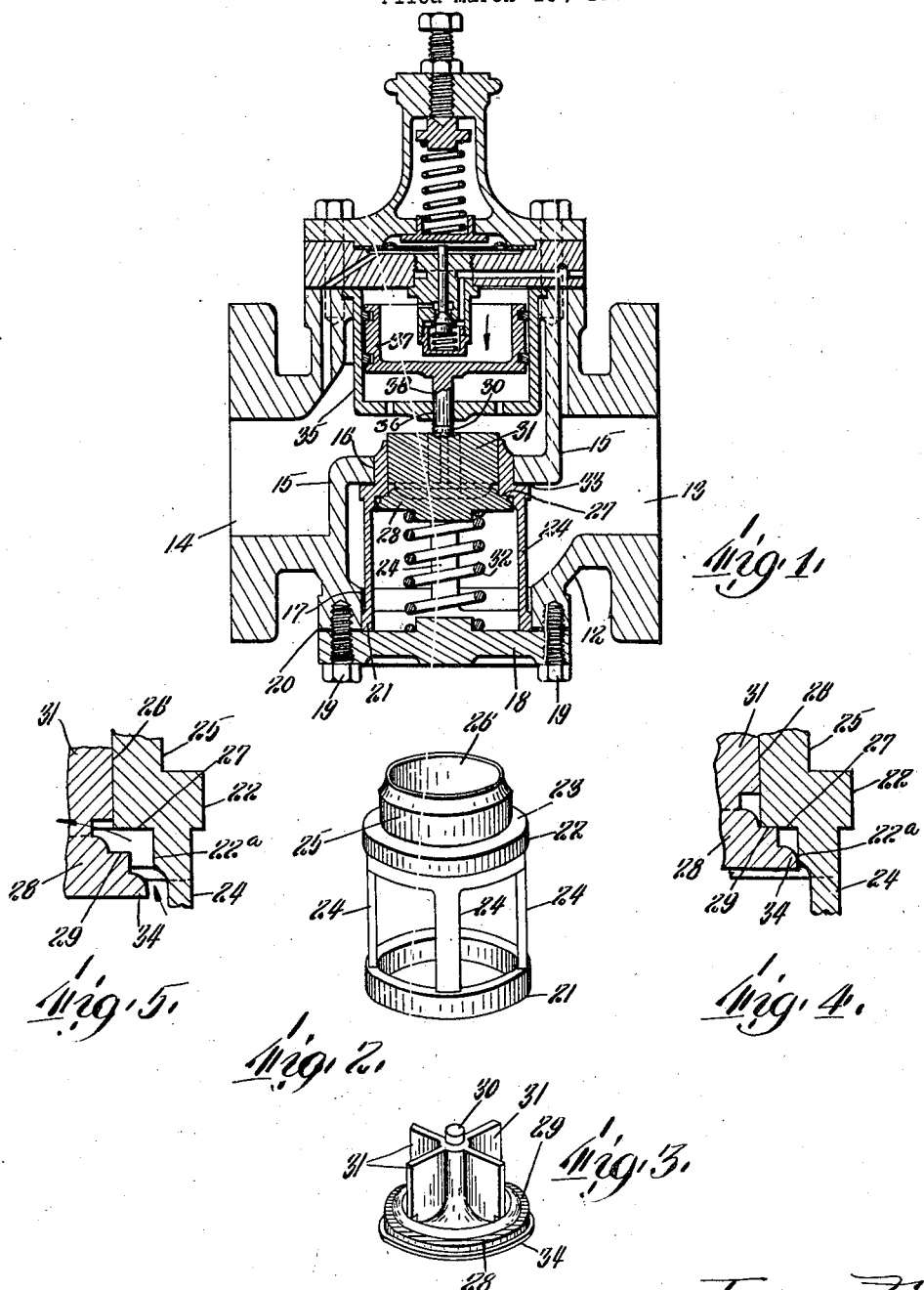
May 29, 1923.
E. WEBB
PRESSURE REDUCING VALVE
Filed March 16, 1922
1,457,049

1,457,049

UNITED STATES PATENT OFFICE.

EDWARD WEBB, OF READING, MASSACHUSETTS, ASSIGNOR OF ONE-HALF TO JULIAN D'ESTE COMPANY, OF CHARLESTOWN, MASSACHUSETTS, A CORPORATION OF MAINE.

PRESSURE-REDUCING VALVE.

Application filed March 16, 1922. Serial No. 544,100.

*To all whom it may concern:*

Be it known that I, EDWARD WEBB, a citizen of the United States, residing at Reading, in the county of Middlesex and State of Massachusetts, have invented new and useful Improvements in Pressure-Reducing Valves, of which the following is a specification.

This invention relates to a pressure-reducing valve, the body of which has an angular bridge containing a circular opening connecting the inlet and outlet portions of the body, a valve seat connected with the bridge, a valve body or disc cooperating with the seat to normally close the bridge opening at the inlet side, and adjustable means at the outlet side of the bridge for causing the fluid pressure at the inlet side to open the valve sufficiently to permit the passage of fluid therethrough at any predetermined reduction of pressure.

The valve seat and the valve disc are subjected to more or less rapid wear, particularly when the valve conducts steam, so that these parts require renewal, and are necessarily separable from the valve body.

One object of the invention is to provide simple, relatively inexpensive, and conveniently operable means for detachably connecting the valve seat with the valve body.

Another object is to so improve the form of the seat, the connecting means, and the valve disc, as to permit the accurate guiding of the valve disc, and ensure unobstructed movements thereof.

Another object is to provide means for preventing obstruction of the movement of the valve disc and pressure actuated parts which move therewith, in case of any slight distortion or warping of the valve body by severe strains on the latter.

Another object is to minimize the noise and the wire-drawing action of live steam on the surfaces of the valve seat and of the valve disc, which closes on the seat.

To these and other related ends the invention consists in the improvements which I will now proceed to describe and claim.

Of the accompanying drawings forming a part of this specification,—

Figure 1 is a vertical section of a valve embodying the invention.

Figure 2 is a perspective view of the cage which guides the valve disc, and includes the valve seat.

Figure 3 is a perspective view of the valve disc.

Figures 4 and 5 are fragmentary sectional views, each showing a portion of the cage and a portion of the valve disc, the latter being shown closed in Figure 4, and open in Figure 5.

The same reference characters indicate the same parts in all of the figures.

The valve body 12 has the usual inlet 13, outlet 14, and angular bridge 15, the bridge being between the inlet and the outlet, and provided with a circular opening 16. In the portion of the body 12 at the inlet side of the bridge, is a circular opening 17, which is coaxial with, and of larger diameter than the bridge opening 16, and is spaced from the latter. A cap 18 detachably secured to the body by screws 19 constitutes an imperforate cover for the opening 17, a packing gasket 20 being interposed between the cap and the portion of the body surrounding the opening. A cage having a valve seat 27, adapted to cooperate with a valve disc in closing the valve at the inlet side, is clamped by the cap 18 against the bridge. Said cage includes an outer ring 21, seated on the cap 18, and having a sliding fit in the opening 17, an inner ring 22, provided with a shoulder 23, seated on the inlet side of the bridge, and rigid spaced apart bars 24, connecting said rings.

The outer ring is provided with an external annular face 25, having a sliding fit in the bridge opening 16, and an internal annular guiding face 26, forming a guide for the valve disc. The seat 27 is formed on the outer ring, at one end of the guiding face 26. 28 represents the valve disc, which is provided with an annular face 29, formed to close upon the seat 27, and with a stem 30, having radial wings 31, in sliding contact with the internal guiding face 26.

The valve disc is normally held closed by a spring 32, seated on the cap 18. When the cap 18 is removed, the cage is removable from the valve body, the inner and outer rings of the cage sliding in the bridge and body openings 16 and 17.

When the parts are being assembled, a packing gasket 33 is applied to the shoulder 23, to form a tight joint between the cage and the bridge, and the cage is guided to place by the walls of the openings 16 and 17.

The cap constitutes an abutment for the spring, and a clamp which releasably confines the cage shoulder 23 against the bridge. The internal guiding face 26 of the inner cage ring constitutes a guide for the valve disc, ensuring free movements of the latter, the said face and the stem wings 31 being so elongated that tipping and binding of the valve disc is prevented.

To minimize the noise and the wire-drawing action of steam passing between the valve seat and the disc face 29, I provide said disc with an outwardly projecting annular riser 34, spaced from the face 29, as best shown by Figures 4 and 5. I also provide the cage ring 22 with an inwardly projecting annular riser 22ª. When the valve disc is open, steam passes through without objectionable noise, and its wearing or wire-drawing force is so distributed that it does not rapidly wear the seat 27 and the face 29.

A well known form of adjustable pressure-controlled means for opening the valve disc to maintain the desired reduced pressure at the outlet side, is shown by Figure 1, and includes a cylinder 35, secured to the valve body at the outlet side, and provided with a head having a guide 36, a piston 37, movable in the cylinder in the direction of the arrow, by pressure admitted from the inlet side, to open the valve disc, and provided with a rod 38, movable in the guide 36, and bearing loosely on the stem 30, of the valve disc.

The valve body is sometimes distorted, or warped by the severe strains to which it is subjected, to such an extent as to locate the axis of the cylinder out of exact alinement with the axis of the valve disc. Such distortion is prevented, by the loose contact of the rod 38 with the stem 30, from interfering with the free movements of the piston and the valve, said rod and stem being free to slip laterally on each other, and thus compensate for any slight misalinement due to the distortion or warping of the valve body.

I claim:

1. A pressure-reducing valve comprising, in combination, a valve body having an angular internal bridge provided with a circular opening, the body being provided with a larger circular opening coaxial with and spaced from the bridge opening; a cap detachably secured to the body and forming an imperforate closure for the body opening; a cage including an outer ring seated on the cap and having a sliding fit in the body opening, and an inner ring provided with a shoulder seated on the bridge, a valve disc seat, an external annular face having a sliding fit in the bridge opening, and an internal annular guiding face forming a valve disc guide, said rings being connected and spaced apart by rigid bars; a valve disc formed to close on said seat, and having a winged stem slidable in said guiding face; and a closing spring interposed between the cap and the valve disc, the cap constituting a spring abutment and a clamp, releasably confining the cage shoulder against the bridge, the cage being guided to and from its operative position by the walls of the body and bridge openings.

2. A pressure-reducing valve comprising, in combination, a valve body having an angular internal bridge provided with a circular opening, a cage detachably secured to the valve body at the inlet side of the bridge, and provided with a valve disc seat, and with a valve disc guide within the bridge opening, a spring-pressed valve disc formed to close on said seat, and provided with a stem projecting from the outlet side of the bridge, the seat and valve disc being arranged to normally prevent the passage of fluid from the inlet to the outlet side of the bridge, adjustable means at the outlet side for causing a predetermined opening of the valve disc by fluid pressure at the inlet side, said means including a fixed cylinder within the valve body having a piston-rod guide, and a piston movable in the cylinder by fluid pressure, and provided with a rod which projects from the cylinder through said guide and contacts loosely with the valve disc stem, the contacting ends of the said piston-rod and stem being adapted to slip laterally on each other and compensate for distortion of the valve body and misalinement of the rod and stem.

3. A pressure-reducing valve comprising, in combination, a valve body having an angular internal bridge provided with a circular opening, a cage detachably secured to the valve body at the inlet side of the bridge, and provided with a valve disc seat, and with a valve disc guide within the bridge opening, a spring-pressed valve disc formed to close on said seat, the seat and valve disc being arranged to normally prevent the passage of fluid from the inlet to the outlet side of the bridge, and adjustable means for causing a predetermined opening of the valve disc by fluid pressure at the inlet side, the valve disc being provided with an annular face parallel with the seat, and with a peripheral outwardly projecting annular riser, spaced from said face, the cage being provided with an annular inwardly projecting riser spaced from the seat.

In testimony whereof I have affixed my signature.

EDWARD WEBB.